United States Patent Office 3,506,677
Patented Apr. 14, 1970

---

3,506,677
PROCESS FOR THE SEPARATION OF N:N'-DIAL-KYL-4:4'-BIPYRIDYLIUM HALIDE SALTS FROM N-ALKYL PYRIDINIUM HALIDE SALTS BY EXTRACTION WITH CHLOROFORM
John Edward Colchester and John Hubert Entwisle, Runcorn, England, assignors to Imperial Chemical Industries Limited, London, England, a corporation of Great Britain
No Drawing. Continuation of application Ser. No. 535,045, Mar. 17, 1966. This application May 26, 1969, Ser. No. 828,812
Claims priority, application Great Britain, Mar. 19, 1965, 11,771/65
Int. Cl. C07d 31/42
U.S. Cl. 260—296                4 Claims

ABSTRACT OF THE DISCLOSURE

There is provided a process for the separation of an N:N'-dialkyl-4:4'-bipyridylium salt from an N-alkyl pyridinium salt which comprises extracting a mixture of the solid halide salts with chloroform. The salts are preferably chlorides.

---

This application is a continuation of Ser. No. 535,045 filed Mar. 17, 1966, now abandoned.

This invention relates to a separation process useful in the production of herbicidal materials.

Thus according to our invention we provide a process for the separation of an N:N'-dialkyl-4:4'-bipyridylium salt from an N-alkyl pyridinium salt which comprises extracting a mixture of the solid halide salts with chloroform.

It is especially preferred that the salts used for the purpose of our invention are the chlorides, though other halide salts may also be used if desired.

The solid salts may be obtained conveniently by evaporating substantially to dryness the reaction mixture in which the salts are obtained. Anions other than halide anions are conveniently removed before this operation or replaced by halide anions using any convenient conventional technique, for example anion exchange or chemical metathesis. To improve the rapidity of separation the mixed salts may be broken up or ground to promote intimate contact with the chloroform.

The N:N'-dialkyl-4:4'-bipyridylium salts may be in particular the N:N'-dimethyl-4:4'-bipyridylium salts but the process is also applicable to compounds containing higher alkyl substituents. Usually the N-alkyl pyridinium salt contains the same alkyl substituent as the N:N'-dialkyl-4:4'-dipyridylium salt, but this is not essential for the purpose of the present invention.

The procedure of extraction may be carried out in any convenient manner and using any conventional equipment or techniques for the purpose. Thus there may be used in particular a form of continuous extraction apparatus such as a Soxhlet apparatus, in which the mixture of solid salts is extracted with the solvent until no more solid is dissolved. Alternatively, the process may be carried out using a batchwise technique in which the solid salts are digested repeatedly with the solvent. The mixture of salts and chloroform may be agitated to assist solution of the soluble component. The extraction may be carried out most conveniently at any temperature between ambient temperature and the boiling point of chloroform, particularly between 20° C. and 62° C. Lower temperatures tend to give a slower extraction rate, while higher temperatures require operation under pressure and so are less convenient. The bipyridylium salt remains substantially undissolved and can then be recovered by drying the solid residue remaining after the solvent extraction, and the pyridinium salt is dissolved by the solvent and can be recovered from it by any conventional or convenient means, for example by evaporation or by extraction with either water or an immiscible polar solvent.

The procedure of our invention has the advantage of being very simple and easy to operate and can effect a very good separation of the two salts. It is surprising that chloroform is so very much more effective and selective in this respect than other commercially available solvents (including other chlorinated hydrocarbon solvents for example methylene chloride), which we have found do not bring about such a sharp and clear separation. Solvents which take up water readily or are miscible with water (for example ethanol, methanol or acetone) are also unsuitable in practice because traces of water (which very easily accumulate in use) greatly increase the solubility of the bipyridylium salt and thus prevent effective separation of the mixed salts.

The invention is illustrated but not limited by the following example in which the parts and percentages are by weight.

EXAMPLE

A solution of 400 parts of N:N'-dimethyl-4:4'-bipyridylium dichloride and 166 parts of N-methyl pyridinium chloride in 10,000 parts of water was evaporated substantially to dryness under reduced pressure. The residue of the mixed salts was extracted three times with 20,000 parts of chloroform, each extraction being for 24 hours at 20° C. The solid residue was found by analysis to contain 398 parts of the bipyridylium salt and 1 part of methyl pyridinium chloride. The chloroform extracts were combined and extracted with, in total, an equal volume of water; the combined aqueous extracts were then found by analysis to contain 163 parts of methyl pyridinium chloride.

The procedure of this example was repeated at the boiling point of the chloroform, and similar results were obtained.

We claim:
1. Process for the separation of an N:N'-di-lower alkyl-4:4'-bipyridylium halide salt from an N-lower-alkyl pyridinium halide salt which comprises extracting a mixture of the solid halide salts with chloroform.
2. Process as claimed in claim 1 wherein the salts used are the chlorides.
3. Process as claimed in claim 1 wherein the extraction is carried out at a temperature between 20° C. and 62° C.
4. Process as claimed in claim 1 wherein the mixed salts treated comprise an N:N'-dimethyl-4:4'-bipyridylium halide and an N-methyl pyridinium halide.

References Cited

UNITED STATES PATENTS 3,159,641  12/1964  Fanshawe _____ 260—296
1,960,334   5/1934  Ernst et al. _____ 260—290

OTHER REFERENCES

Klingsberg, Pyridine and Derivatives, Part Two, Interscience (1961), pp. 31 and 228 QD 401 K5.

HENRY R. JILES, Primary Examiner
A. L. ROTMAN, Assistant Examiner